(12) United States Patent
Thai et al.

(10) Patent No.: US 11,061,559 B2
(45) Date of Patent: Jul. 13, 2021

(54) CONTROLLING USER INTERFACES FOR ELECTRONIC DEVICES

(71) Applicant: HEWLETT-PACKARD DEVELOPMENT COMPANY, L.P., Houston, TX (US)

(72) Inventors: Thong Thai, Houston, TX (US); Syed S. Azam, Houston, TX (US); Mike Provencher, Houston, TX (US); Rahul V. Lakdawala, Houston, TX (US)

(73) Assignee: Hewlett-Packard Development Company, L.P.

( * ) Notice: Subject to any disclaimer, the term of this patent is extended or adjusted under 35 U.S.C. 154(b) by 14 days.

(21) Appl. No.: 16/079,758

(22) PCT Filed: Oct. 25, 2016

(86) PCT No.: PCT/US2016/058619
§ 371 (c)(1),
(2) Date: Aug. 24, 2018

(87) PCT Pub. No.: WO2018/080443
PCT Pub. Date: May 3, 2018

(65) Prior Publication Data
US 2019/0056864 A1    Feb. 21, 2019

(51) Int. Cl.
*G06F 3/0488* (2013.01)
*G06F 21/32* (2013.01)
*G06K 9/00* (2006.01)

(52) U.S. Cl.
CPC ........ *G06F 3/04886* (2013.01); *G06F 3/0488* (2013.01); *G06F 21/32* (2013.01);
(Continued)

(58) Field of Classification Search
CPC .... G06F 21/32; G06F 3/0488; G06F 3/04886; G06K 2009/00395; G06K 9/00013; G06K 9/00288
(Continued)

(56) References Cited

U.S. PATENT DOCUMENTS

| | | | |
|---|---|---|---|
| 2010/0053089 A1 | 3/2010 | Kwok et al. | |
| 2010/0085317 A1* | 4/2010 | Park | G06F 1/1626 345/173 |

(Continued)

FOREIGN PATENT DOCUMENTS

| | | |
|---|---|---|
| WO | 2012091574 A1 | 7/2012 |
| WO | 2015127142 A1 | 8/2015 |

OTHER PUBLICATIONS

"On-Screen Keyboard—Sony Xperia™ Dual SIM Support", Retrieved from Internet: http://support.sonymobile.com/global-en/xperiaxadual/userguide/On-screen-keyboard/, Sep. 16, 2016, 4 pages.

*Primary Examiner* — Kwin Xie
(74) *Attorney, Agent, or Firm* — Trop, Pruner & Hu P.C.

(57) ABSTRACT

A technique includes detecting a finger pattern that is associated with a physical interaction of a user with a touch screen of an electronic device. The technique includes acquiring sensory input that is associated with the user other than a characteristic of the physical interaction of the user with the touch screen. The technique includes determining whether the physical interaction is associated with an intent to use the touchscreen for key-based input entry based at least in part on the sensory input and controlling a user interface for the electronic device based at least in part on the detected finger pattern and the determined intent.

20 Claims, 9 Drawing Sheets

(52) U.S. Cl.
CPC ..... *G06K 9/00013* (2013.01); *G06K 9/00288* (2013.01); *G06K 2009/00395* (2013.01)

(58) Field of Classification Search
USPC .................................................. 345/173–174
See application file for complete search history.

(56) References Cited

U.S. PATENT DOCUMENTS

| | | | |
|---|---|---|---|
| 2010/0225443 A1* | 9/2010 | Bayram | G06F 21/316 340/5.83 |
| 2010/0259561 A1 | 10/2010 | Forutanpour et al. | |
| 2011/0175826 A1 | 7/2011 | Moore et al. | |
| 2011/0285631 A1 | 11/2011 | Imamura et al. | |
| 2011/0296333 A1 | 12/2011 | Bateman et al. | |
| 2012/0229519 A1* | 9/2012 | Stallings | G06F 3/04886 345/661 |
| 2012/0235912 A1* | 9/2012 | Laubach | G06F 3/0213 345/163 |
| 2013/0033477 A1* | 2/2013 | Sirpal | G06F 1/1616 345/211 |
| 2013/0234942 A1 | 9/2013 | Yoo et al. | |
| 2013/0275907 A1 | 10/2013 | Lau et al. | |
| 2014/0218298 A1 | 8/2014 | Law et al. | |
| 2014/0267044 A1 | 9/2014 | Andersen | |
| 2014/0310804 A1 | 10/2014 | Apostolos et al. | |
| 2015/0293694 A1 | 10/2015 | Bozzini et al. | |
| 2015/0293695 A1* | 10/2015 | Schonleben | G06F 3/0412 345/173 |
| 2015/0356286 A1* | 12/2015 | Quirk | H04L 9/3231 726/19 |
| 2017/0017393 A1* | 1/2017 | Luo | G06F 3/04817 |
| 2017/0123492 A1* | 5/2017 | Marggraff | G06F 3/0236 |

\* cited by examiner

CONTROLLING USER INTERFACES FOR ELECTRONIC DEVICES

BACKGROUND

A computer may contain one or multiple input devices for purposes of receiving user input. The input devices may be actual, physical devices and/or virtual devices. For example, a laptop or desktop computer may receive input through such actual, physical devices as a keyboard, mouse or trackpad. A computer that contains a touch screen, such as a tablet computer or a smartphone, may receive input through a virtual keyboard.

DETAILED DESCRIPTION

An electronic device, such as a tablet computer, may contain a touch screen, which allows a user to provide input by physically interacting with the touch screen based on images that are displayed on the touch screen. For example, the user may physically contact the touch screen using a finger-based touch gesture, such as a swiping touch gesture, a touch gesture in which the user taps a certain area of the touch screen, and so forth. The electronic device may provide a virtual key-based user interface, such as a virtual keyboard or keypad. For example, the electronic device may display an image of a keyboard on the touch screen, which defines regions of the touch screen that are associated with different keys, so that contact with a particular displayed key registers a corresponding input value associated with the key. In this manner, the user may be browsing the Internet, and a particular website may cause the electronic device to display a data entry box. By typing using the virtual keyboard, the user may enter requested information into the data entry box.

The electronic device may not always display a user interface at the appropriate time or display the appropriate user interface. For example, the electronic device may display a virtual key-based interface when the user does not intend to enter data into a data entry box, thereby obscuring content that would otherwise be displayed on the touch screen. As another example, the electronic device may display a full virtual keyboard (instead of a virtual numeric keypad, for example) when number data is to be entered into a data entry box. In accordance with example implementations that are described herein, the electronic device determines, through sensory data, whether a user intends to enter input using an interface, (i.e., whether the user intends to invoke a user interface) and if so, the electronic device selects the appropriate user interface based on a detected finger pattern, i.e., based on the number of the finger digits in contact with the touch screen, the placement of the digits, whether the digits are associated with one hand, and so forth.

Figure 1:
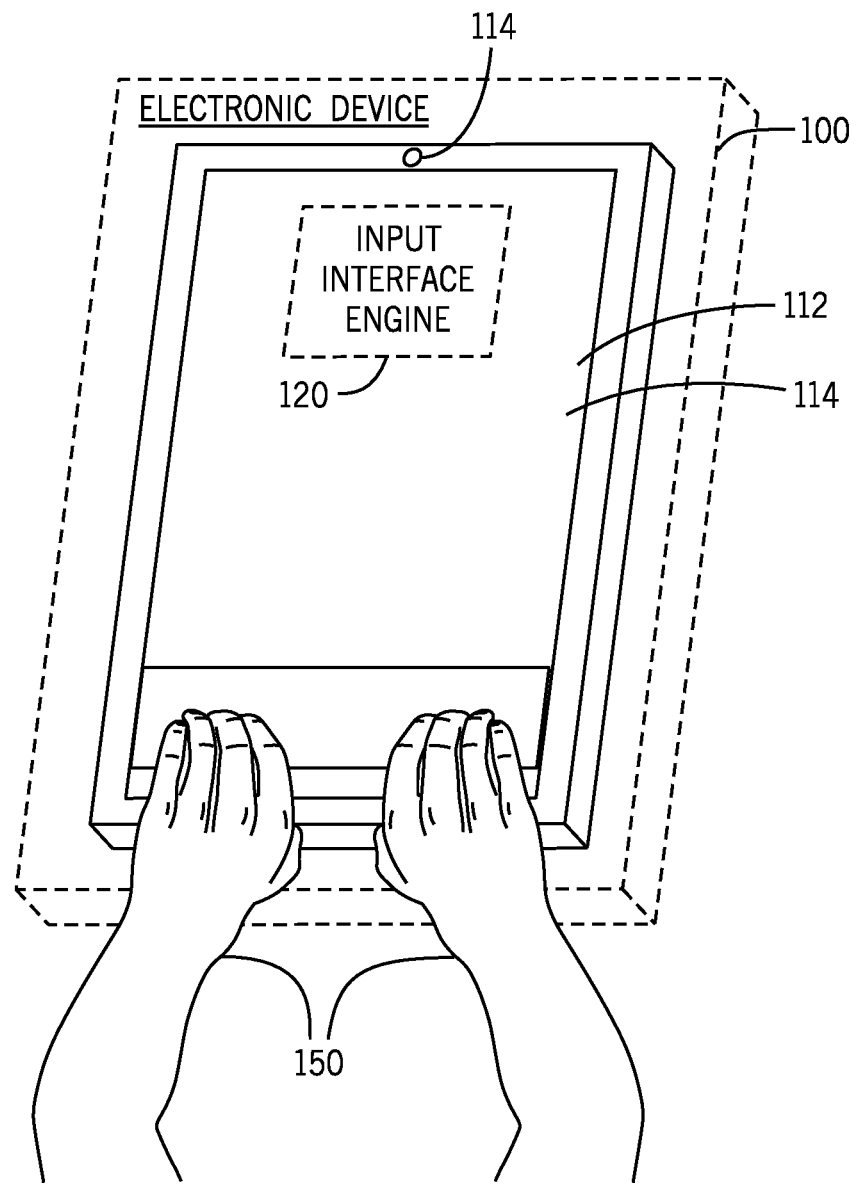
FIG. 1 is a perspective view of an electronic device according to an example implementation.

Referring to FIG. 1, as a more specific example, in accordance with some implementations, an electronic device 100, such as a tablet computer (as depicted in FIG. 1) may include a touch screen 112 (a surface capacitive-based touch screen, resistive-based touch screen, projective capacitive-based touch screen, surface acoustic wave (SAW)-based touch screen, and so forth), which contains a surface 114 that displays images and receives touch-based input in connection with a graphical user interface (GUI). In this manner, as depicted in FIG. 1, the electronic device 100 may display images in association with one or multiple GUIs in which physical interaction between a user's hand or hands 150 may be used to supply user input for the electronic device 100.

In accordance with example implementations, the electronic device 100 includes an input interface engine 120, which controls GUIs for the electronic device 100. In particular, in accordance with example implementations, the input interface engine 120 uses sensory input for purposes of selecting an appropriate GUI for the electronic device 100 and invoking the GUI at the appropriate time. In this manner, in accordance with example implementations, the input interface engine 120 invokes a particular GUI for the electronic device 100 based at least in part on a detected finger pattern and the result of a determination of whether the user intends to use the touch screen 112 for key-based input entry. In this manner, as described herein, the input interface engine 120 may detect physical interaction between the user's hand or hands 150 and the touch screen 112. The physical interaction may be one or multiple fingers, or digits, physically touching or hovering over the touch screen 112.

The input interface engine 120 may further acquire sensory input that is associated with the user, other than sensory input that is associated with a characteristic of the physical interaction between the user and the touch screen 112. Based on this sensory input, the input interface engine 120 may determine whether the user intends to use the touch screen 112 for key-based input entry, and accordingly, the input interface engine 120 may select a virtual key-based user interface for the electronic device 100 based at least in part on the detected finger pattern and the determined intent.

Figure 2:
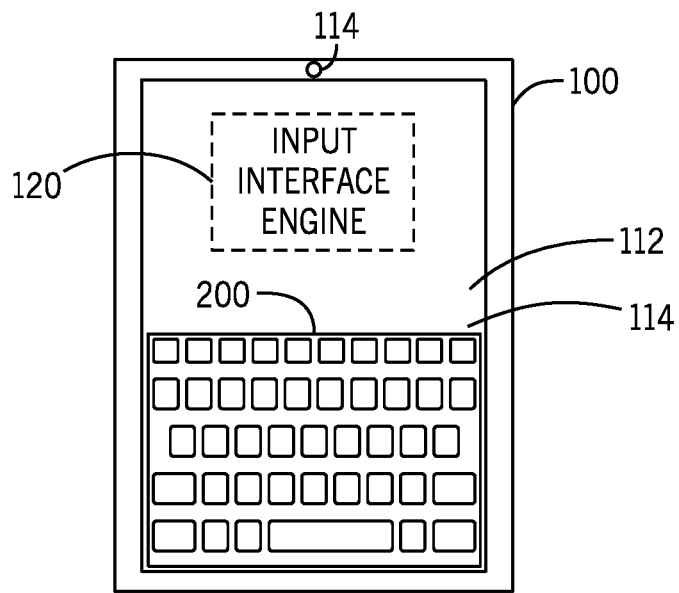
FIG. 2 is a front view of the electronic device illustrating a virtual keyboard according to an example implementation.
Figure 3:
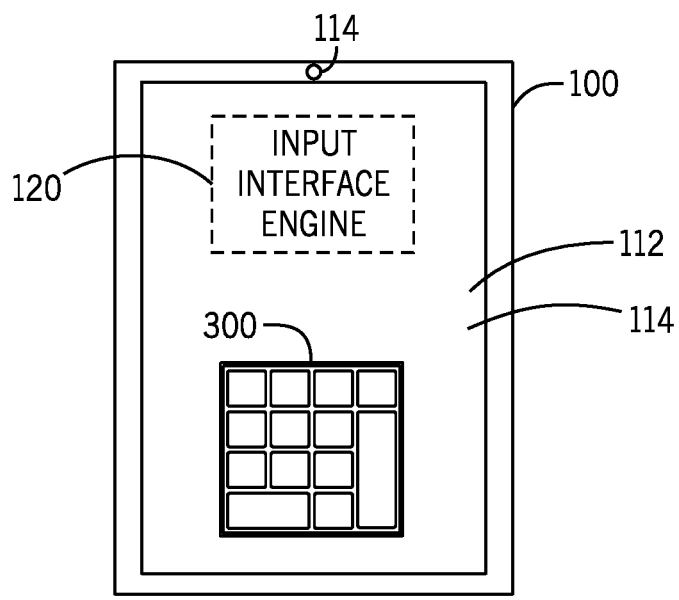
FIG. 3 is a front view of the electronic device illustrating a virtual numeric keypad according to an example implementation.

For example implementations that are described herein, the input interface engine 120 may select between such virtual key-based user interfaces as a full size virtual keyboard-based user interface in which an image of a full size keyboard is displayed on the touch screen 112, such as a keyboard image 200 that is depicted in FIG. 2, or a virtual numeric keypad (also called a "numpad"), in which an image 300 of a numeric pad that is depicted in FIG. 3 is displayed on the touch screen 112. The selection of the particular user interface, such as the virtual keyboard interface or numeric keypad interface, may depend on several factors, including, for example, whether a cursor is in a data entry field (a data entry box, for example) that is associated with the entry of alphanumeric characters (appropriate for the virtual alphanumeric keyboard) or the entry of numbers (appropriate for the virtual numeric keypad). Moreover, the input interface engine 120 may consider other factors when selecting the user interface, such as, for example, the number of fingers contacting the touch screen 112.

For example, in accordance with example implementations, the input interface engine 120 may, in response to detecting a ten finger pattern and one or multiple palms interacting with the touch screen 112, select a virtual alphanumeric keyboard user interface. In accordance with further example implementations, the input interface engine 120 may select the virtual alphanumeric keyboard interface in response to detecting eight to ten fingers with or without the detection of two palms. Moreover, the input interface engine 120 may select a virtual numeric keypad user interface in response to detecting four or five fingers in contact with the touch screen 112 with or without two palms, depending on the particular implementation.

In accordance with example implementations, for purposes of discriminating between physical interactions with the touch screen 112 that are intended to invoke a particular user interface and physical interactions that are not intended to invoke specific user interfaces, the input interface engine 120 may filter detected finger patterns based on time. In this manner, in accordance with some implementations, the input interface engine 120 may consider finger patterns in which the interaction with the touch screen 112 lasts at least a predetermined duration (a duration of at least five seconds, for example), and may ignore detected finger patterns that are associated with lesser durations.

Some physical interactions with the touch screen 112 may not be associated with an intent to use or invoke a particular user interface. In this manner, brief contact with the touch screen 112 may not be intended to invoke a user interface and may be filtered out based on contact time, as discussed above. As another example, a user may be carrying the electronic device 100 in a grip position in which four fingers (for example) of the user's hand contacts the touch screen 112. The user, however, may not intend to invoke, for example, the virtual numeric keypad or any other user interface. As another example, a user may be corroborating with another person and as such, may contact the touch screen 112 when passing the electronic device to the other person for viewing. Once again, contact between the touch screen 112 and fingers may not be intended to invoke a particular user interface. In accordance with example implementations, the electronic device 100 considers sensory input, other than sensory input associated with detection of parts of the hand or hands with the touch screen 112, for purposes of discriminating when contact with the touch screen 112 is intended to involve a user interface.

For example, in accordance with some implementations, the user interface engine 120 may acquire data to attempt to identify a person that is interacting with the touch screen 112. For example, in accordance with example implementations, a user-facing camera 114 (see FIG. 1) of the electronic device 100 may acquire data representing the user, assuming that the user is in front of the touch screen 112. The user interface engine 120 may, for example, apply facial recognition processing for purposes of identifying any person, whose image is acquired in the snapshot image that is captured by the camera 114. For example, the user interface engine 120 may extract characteristics from the image and compare these characteristics to stored characteristics of one or multiple previously-authenticated users. As such, the user interface engine 120 may then determine whether an authenticated user is viewing the touch screen 112. For example, the user interface engine 120 may determine that the physical interaction with the touch screen 112 is intended to invoke a virtual keypad-based user interface based on identification of the authenticated user or, as another example, based on the proximity of an authenticated user to the electronic device 100. As another example, the user interface engine 120 may sense biometric information, such as a finger print using a finger print sensor or perform a retina scan for purposes of identifying a user, thereby providing indicators, which the user interface engine 120 may then use to determine whether the physical contact is intended to invoke a virtual keypad-based user interface. As yet another example, the user interface engine 120 may attempt to communicate with one or multiple wearable devices associated with authenticated users for purposes of determining whether an authenticated user is in proximity to the electronic device 100.

Thus, in accordance with example implementations, the user interface engine 120 may process sensory data, such as data acquired by touch sensors, data acquired by cameras, data acquired by biometric sensors, data acquired by communicating with nearby wearable devices, data representing an orientation of the electronic device, and so forth, for purposes of determining an intent to invoke a user interface of the device. In this manner, the user interface engine 120 may process the sensory data for purpose of identifying whether the user is recognized and determining whether a recognized user is performing one or multiple actions that are consistent with an intent to invoke a user interface of the electronic device 100. For example, the user interface engine 120 may determine, using the sensory data, whether a recognized user is approaching or remaining close enough to the touch screen for interaction with the touch screen; whether a recognized user is facing or viewing the touch screen; whether the electronic device 100 being placed in an orientation consistent with user interaction with the touch screen (the touch screen facing upward, for example); whether a recognized user is holding the electronic device consistent with a carrying position; and so forth As described further herein, in accordance with example implementations, the electronic device may have multiple, user configurable device modes. The device modes refer to different operational modes of the electronic device, which correspond to a physical orientation or physical configuration of the electronic device. For example, the electronic device may have two display panels that share a hinged connection, which allows the electronic device to be configured in different devices modes, depending on the spatial orientation of the electronic device and the opening angle (about the hinge axis) between the display panels. In this manner, as further described herein, the device modes may include modes of operation in which the electronic device may be used as a laptop computer, a tablet computer, and so forth; and the user interface engine 120 may, through sensory data, identify the device mode and base the determination of the user intent to invoke a user interface at least in part on the determined device mode.

Moreover, as further described herein, in accordance with some implementations, the user interface engine 120 may consider sensory data that recognizes multiple users and possibly characteristics or actions associated with the multiple users for purposes of determining an intent to invoke a particular user interface. For example, in accordance with some implementations, as described further herein, the electronic device may have multiple visual display panels, and the user interface engine 120 may selectively invoke multiple user interfaces in connection with the multiple visual display panels, depending on the device mode of the electronic device, the processing of other sensory data to determine intent(s) of the other user(s) to invoke user interfaces, the number of recognized or authorized users detected, the locations of the detected users, and so forth. Moreover, the user interface engine 120 may determine whether different users intend to invoke corresponding user interfaces at different times (invoke the user interfaces at different times, for example) or at the same time (invoke multiple user interfaces for multiple users at the same time, for example).

In accordance with some implementations, the user interface engine 120 may determine whether a user intends to invoke a user interface by selectively weighting intent user indicators (a proximity of user indicator, a device mode indicator, a detected grip indicator, an orientation of electronic device indicator, and so forth) and determining, based on a resulting weighted score, whether the user intends to invoke a user interface.

Figure 4A:
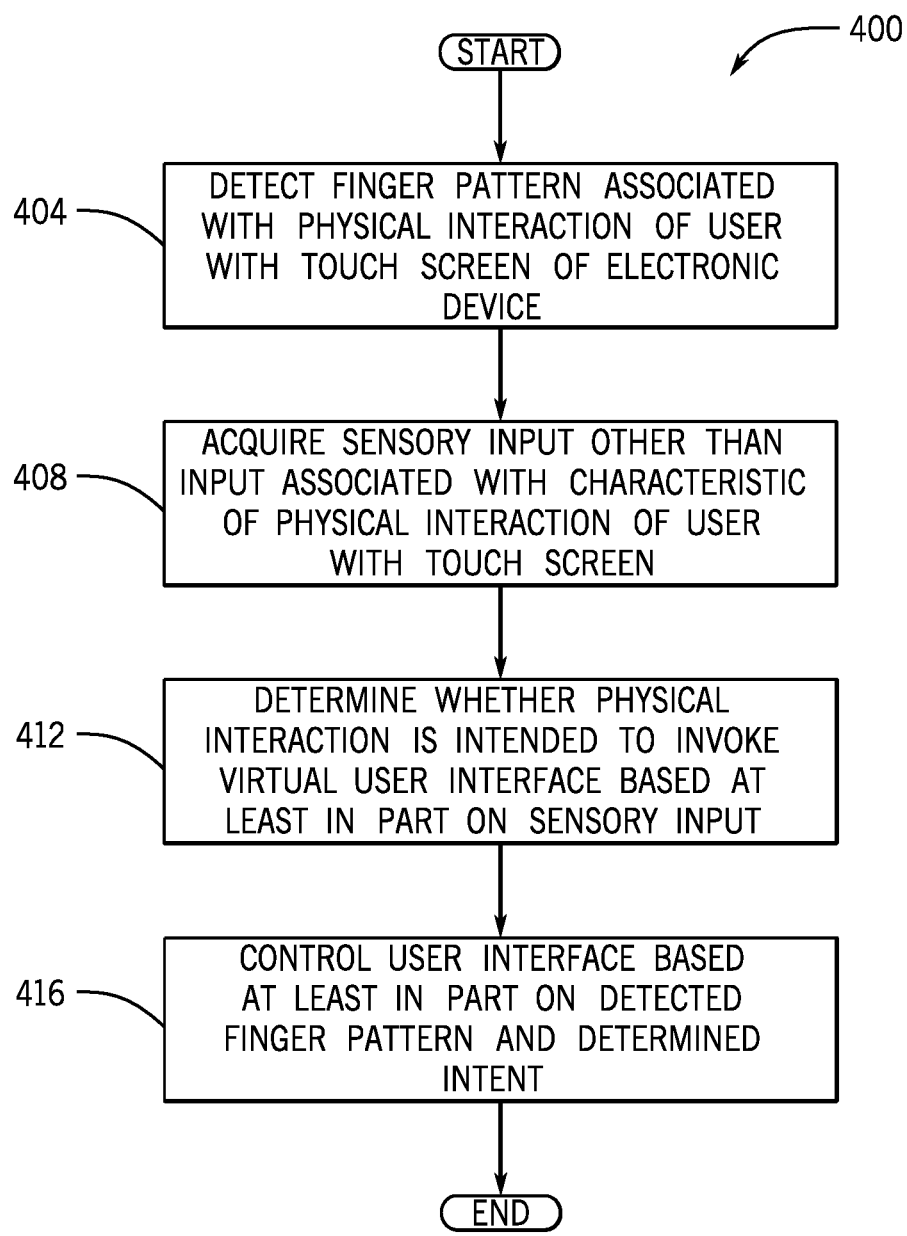
FIGS. 4A and 4B are flow diagrams depicting techniques to control a user interface of an electronic device according to example implementations.

Thus, referring to FIG. 4A, in accordance with example implementations, the user interface engine 120 may perform a technique 400 that is depicted in FIG. 4A. Referring to FIG. 4A, the technique 400 includes detecting (block 404) a finger pattern that is associated with a physical interaction of a user with a touch screen of an electronic device and acquiring (block 408) sensory input other than input that is associated with a characteristic of the physical interaction of the user with the touch screen. The technique 400 includes determining (block 412) whether the physical interaction is intended to invoke a virtual user interface based at least in part on the sensory input and controlling (block 416) the user interface based at least in part on the detected finger pattern and the determined intent.

Figure 4B:
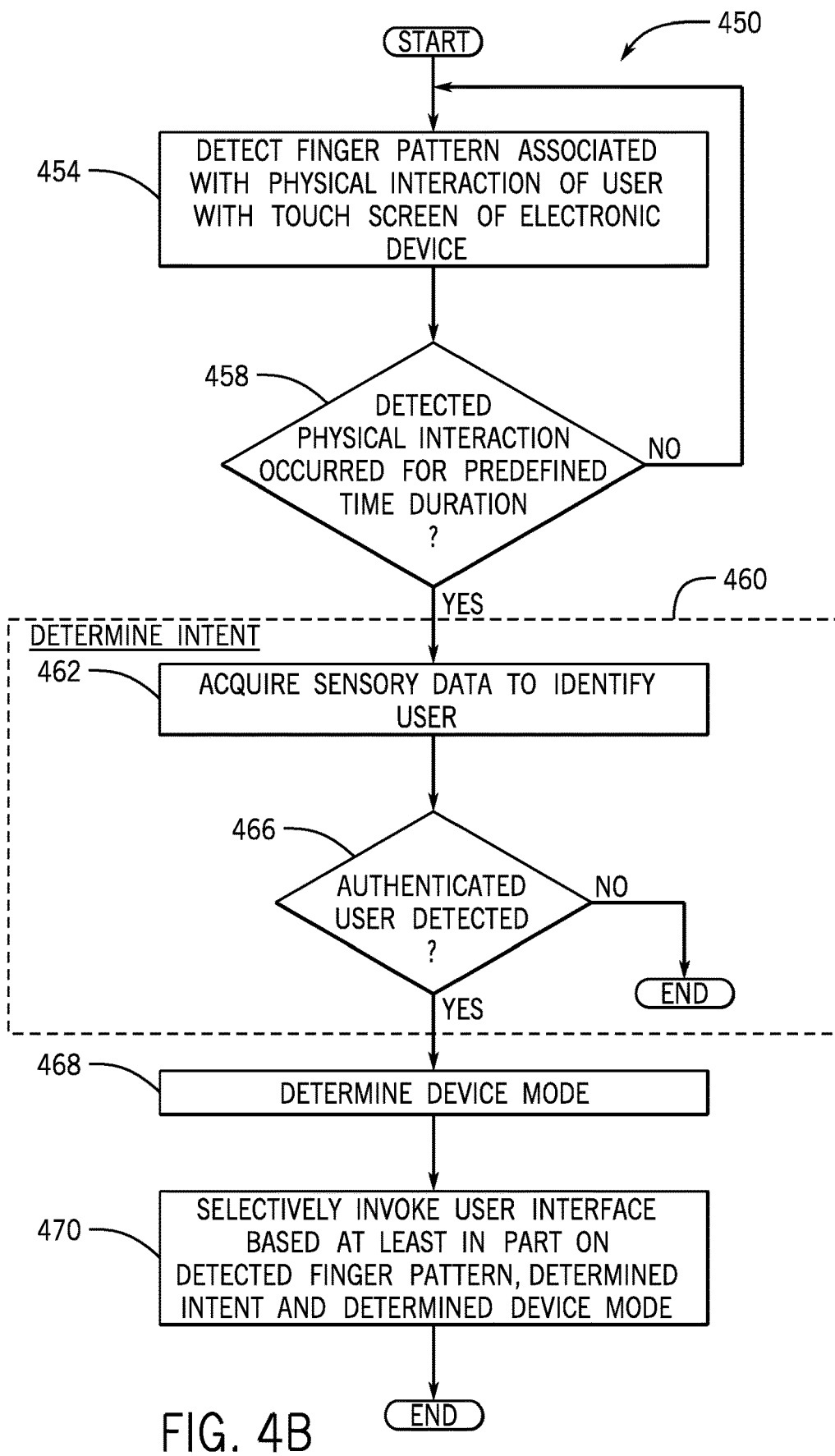

More specifically, in accordance with example implementations, the user interface engine 120 may perform a technique 450 that is depicted in FIG. 4B. Referring to FIG. 4B, the technique 450 includes detecting (block 454) a finger pattern that is associated with a physical interaction of a user with a touch screen of an electronic device and determining (decision block 458) whether the detected physical interaction has occurred for a predefined time duration. If so, the technique 450 includes determining an intent to use key-based input entry (block 460) and selectively invoking a user interface based at least in part on the detected finger pattern and determined intent, pursuant to block 470.

More specifically, in accordance with example implementations, determining the intent (block 460) includes acquiring (block 462) sensory data that identifies the user. This sensory data may include, for example, biometric information, a user image, data representing results (recognized identification, for example) obtained by communication with a wearable device, and so forth. After determining (decision block 466) that an authorized user has been detected and determining the intent (block 460) of the user to user to invoke a user interface, the technique 450 may include, in accordance with example implementations, determining a device mode of the electronic device, pursuant to block 468. In accordance with example implementations, the technique 450 includes selectively invoking a user interface based at least in part on the detected finger pattern, the determined intent, and the determined device mode, pursuant to block 470.

In accordance with example implementations, by identifying the user and determining that a particular virtual user interface is to be invoked, the electronic device 100 may then select (block 470) one or multiple characteristics of the user interface. For example, via user-defined configuration options, the user interface 120 may determine that the particular identified user has defined a user preferred keypad orientation, keypad size, keypad color, and so forth. Moreover, via a user-defined configuration option, a user may define a layout of keys, may define a keypad interface with certain keys that are omitted or added (from a default keyboard layout provided by the electronic device 100), and so forth.

Figure 5:
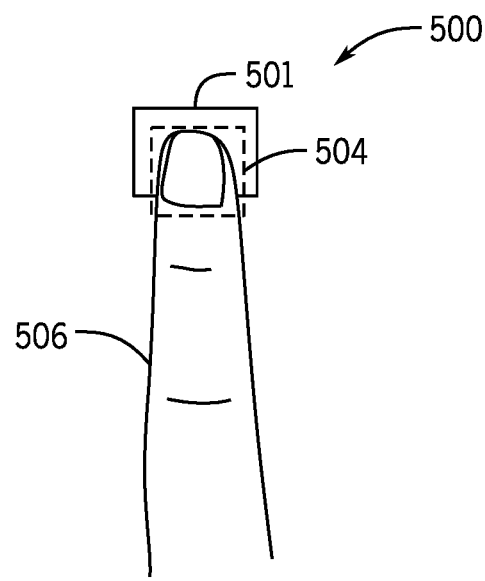
FIG. 5 is an illustration of a physical interaction of a finger with a touch screen according to an example implementation.
Figure 6:
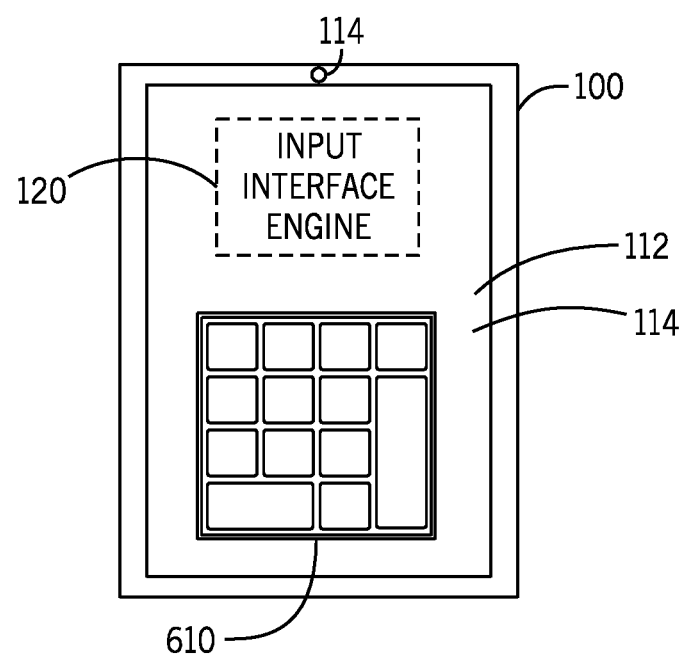
FIG. 6 is a front view of an electronic device illustrating the resizing of virtual keypads based on a detected finger contact area according to an example implementation.

In accordance with example implementations, the user interface engine 120 may consider other factors in selecting a particular user interface. For example, hand and finger size may vary among potential users of the electronic device 100. An appropriate keypad size for one user may be too small or too large for another user. In accordance with example implementations, the user interface engine 120 regulates, or selects, the sizes of keys of a virtual key-based user interface based on a detected contact area between the user's finger and the touch screen 112. More specifically, referring to FIG. 5, in accordance with example implementations, the user interface engine 120 may detect an area 504 of contact (direct physical contact or a hovering contact) between a given virtual key 501 and a finger 506. In accordance with further implementations, the contact area 501 may not be between the finger and a specific key, but rather, may be, in general, a contact area defined between the user's finger depressing or hovering over any area of the touch screen 112. Regardless of the particular implementations, the user interface engine 120 may then regulate the size of the keys of the virtual key-based user interface based on the detected contact area. In this manner, for larger finger sizes, the user interface engine 120 may select larger keys for the displayed keyboard/keypad, with the sizes between keys and the overall size of the interface being scaled accordingly. For example, FIG. 6 depicts the electronic device 100 displaying a numeric keypad image 600 that is larger (based on a larger detected finger size) than, for example, the corresponding keypad image 300 that is depicted in FIG. 3.

Figure 7:
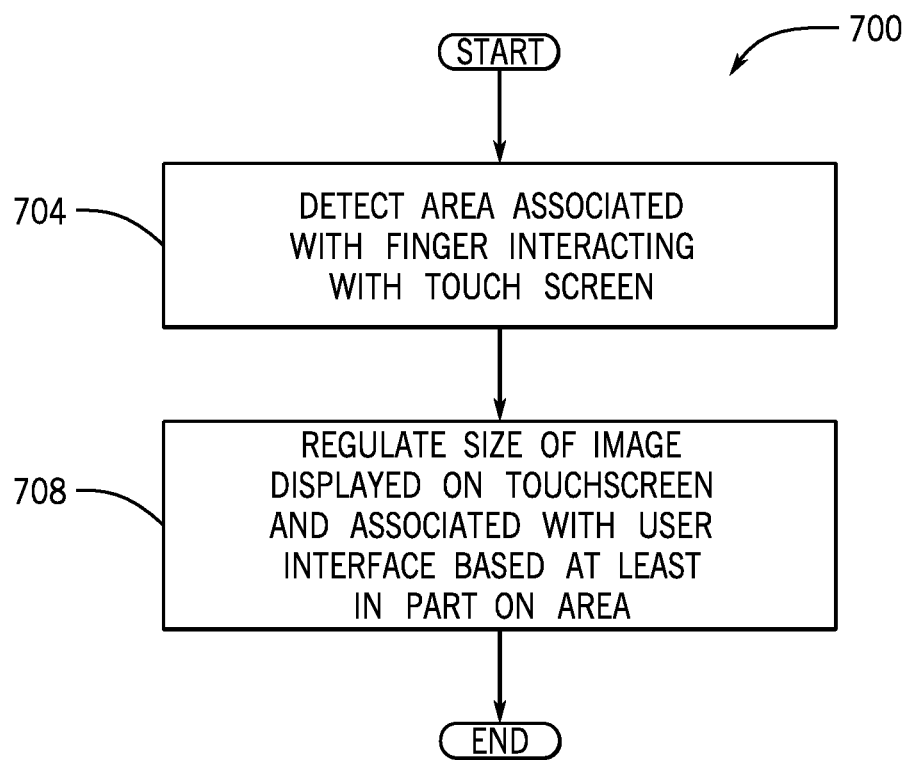
FIG. 7 is a flow diagram depicting a technique to regulate the size of images displayed on a touch screen of an electronic device based on a detected finger contact area according to an example implementation.

Thus, in accordance with example implementations, the user interface engine 120 may perform a technique 700 that is depicted in FIG. 7. Pursuant to the technique 700, the user interface engine 120 may detect (block 704) an area that is associated with a finger interacting with a touch screen. Pursuant to the technique 700, a size of the image that is displayed on the touch screen and associated with the user interface engine 120 may then regulate the user interface based at least in part on the area, pursuant to block 708.

Figure 8:
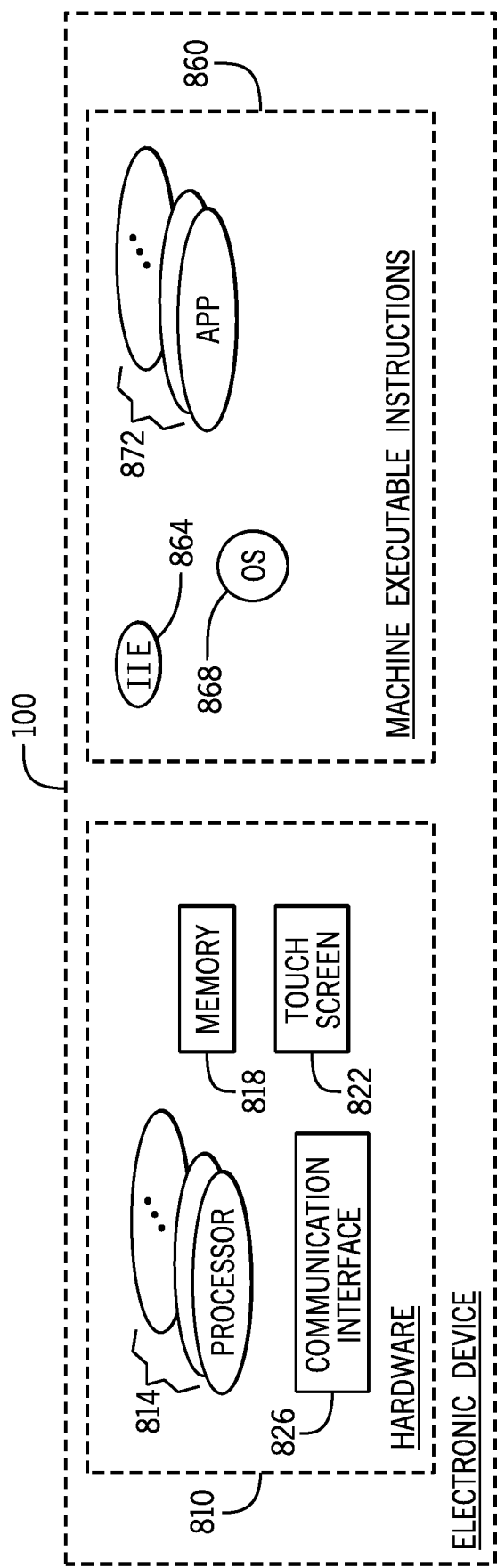
FIG. 8 is a schematic diagram of an electronic device according to an example implementation.

Referring to FIG. 8, in accordance with example implementations, the electronic device 100 may be a physical machine that includes hardware 810 and machine executable instructions 860, or "software." More specifically, in accordance with example implementations, the hardware 810 may include one or multiple processors 814 (one or multiple central processing units (CPUs), CPU processing cores, and so forth) and a memory 818.

The memory 818, in general, is a non-transitory storage medium that may store, as examples, user input data, data acquired by sensors 819 of the electronic device 100, user-defined configuration option data, data used to authenticate users, machine-executable instructions that are executed by the processor(s) 814 for purposes of implementing one or more of the techniques that are described herein, and so forth. The memory 818 may be formed from semiconductor storage devices, memristors, magnetic storage devices, phase change memory devices, a combination of one or more of these storage technologies, and so forth, depending on the particular implementations.

In accordance with example implementations, the hardware 810 may further include the touch screen 822, one or multiple communication interfaces 826, and the camera 814. Moreover, in accordance with example implementations, the sensors may include biometric sensors, touch sensors associated with the touch screen 822, and so forth.

In accordance with example implementations, the machine executable instructions 860 of the electronic device 100 may include instructions 864 that when executed by the processor(s) 814, cause the processor(s) 814 to provide the user interface engine 864, instructions 872, that when executed by the processor(s) 814 cause the processor(s) 814 to provide one or multiple applications 872, instructions 868 that when executed by the processor(s) 814 cause the processor(s) 814 to provide an operating system, and so forth.

In accordance with further example implementations, all or part of the above-described processor-based architecture may be replaced by dedicated, hardware circuitry or by one or multiple application specific integrated circuits (ASICs).

Figure 9:
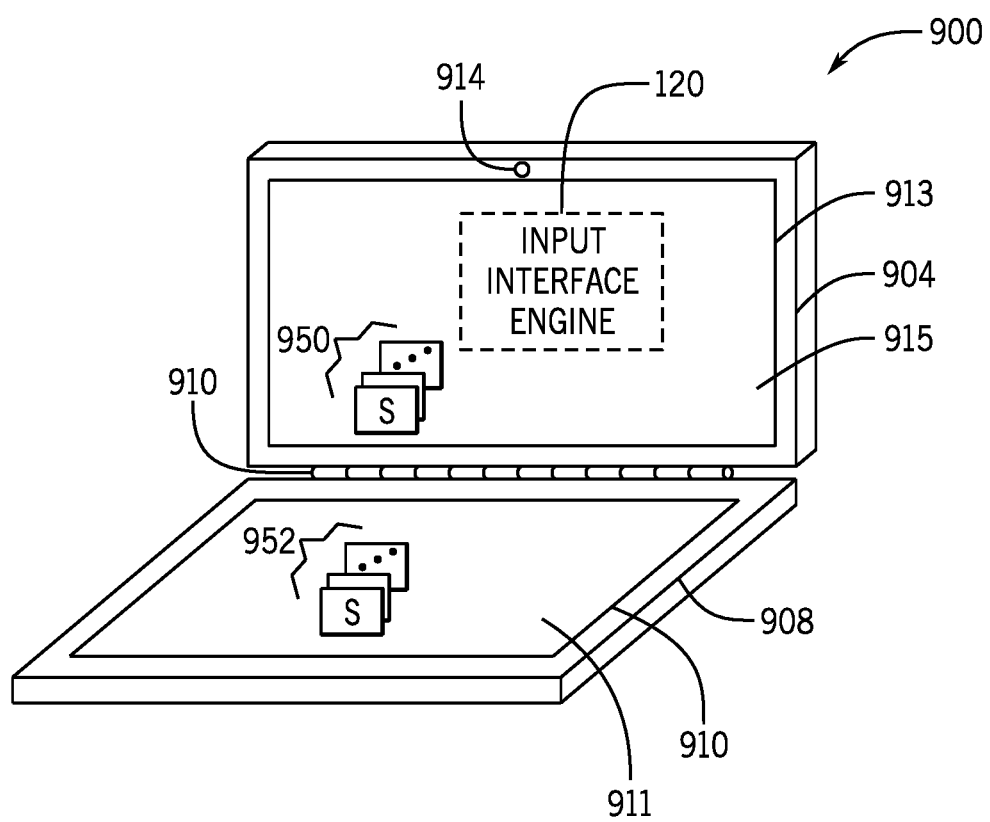
FIG. 9 is a perspective view of an electronic device having two display panels according to an example implementation.

In FIG. 1, the example electronic device 100 contains a single touch screen 112. However, in accordance with further example implementations, the systems and techniques that are described herein may be applied to a multiple display computer 900 that is depicted in FIG. 9. In this regard, the multiple display computer 900 includes multiple touch screens, such as a touch screen 913 that is associated with a display panel 904 and has a surface 915 for displaying images and receiving touch input; and a touch screen 910 that is associated with a display panel 908 and has a surface 911 for displaying input and receiving touch input. For this example implementation, the display panels 904 and 908 may be connected by a hinge connection 910. In this regard, as an example, the user interface engine 120 may regulate user interfaces that are displayed on a particular display panel based on the device mode of the computer 900. As depicted in FIG. 9, in accordance with example implementations, the computer 900 includes a camera 914 that is disposed on the display panel 904. Moreover, the computer 900 may have an architecture similar to the architecture of the electronic device 100, including the user interface engine 120.

Figure 10:
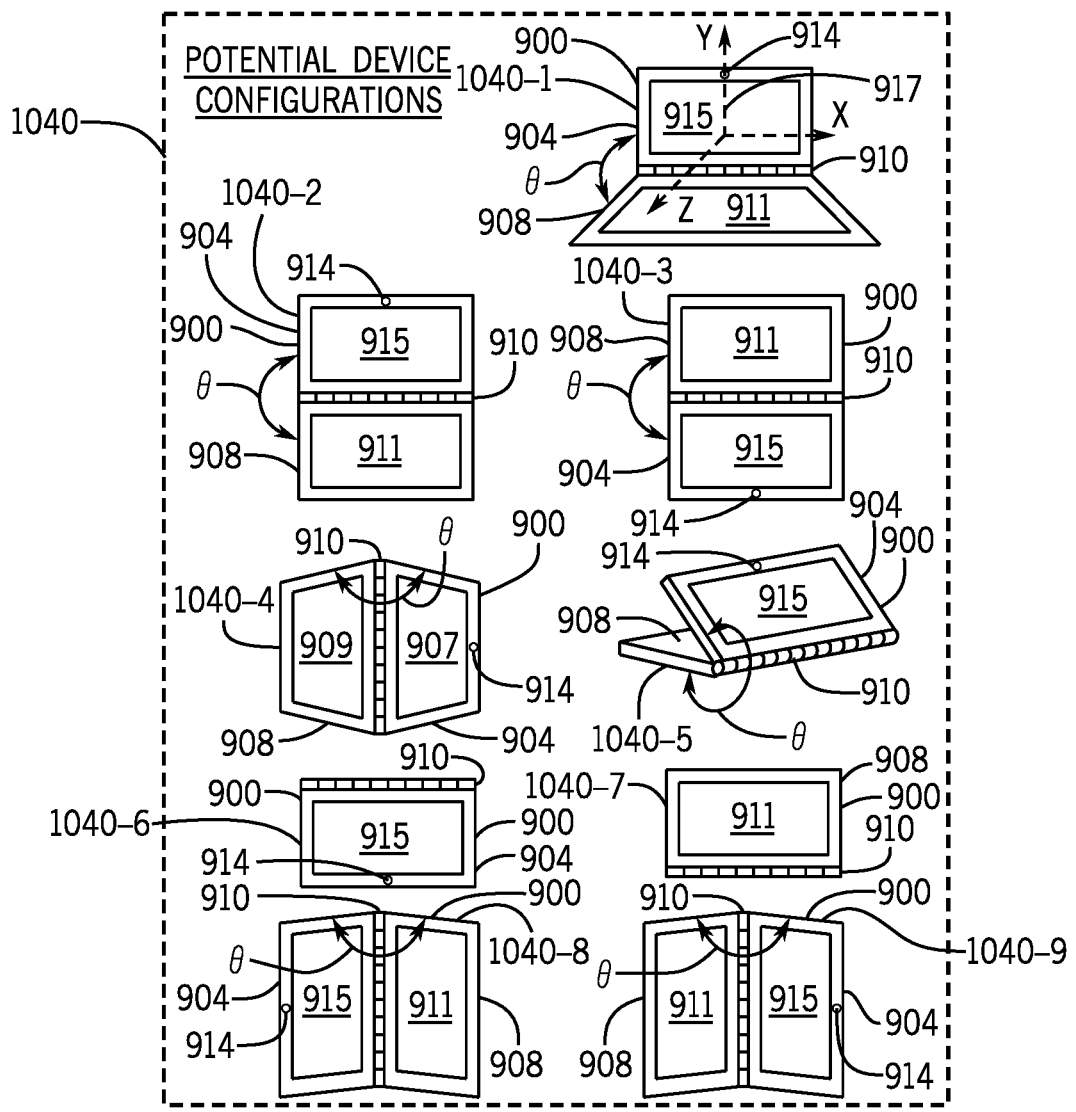
FIG. 10 is an illustration of potential device modes for the electronic device of FIG. 9 according to an example implementation.

FIG. 10 depicts potential display configurations 1040 for the computer 900, depending on the overall spatial orientation of the computer 900 (such as the spatial orientation of the computer 900 relative to the vertical direction, or direction of gravity) and an opening angle Θ between the display panels 904 and 908. As depicted in FIG. 1, for reference, local orthogonal X, Y and Z axes 917 may be defined with respect to the display panel 904, where the X axis 917 corresponds to the pivot axis of the hinge connection 910; and the Z axis 917 may be generally aligned with a surface normal of the display surface 915 of the display panel 904 and have a positive directed toward the user when the user is in front of the display panel 904. In accordance with example implementations, the camera 914 may have an optical axis that is aligned with the Z axis 917. The opening angle Θ is the angle between the display panels 904 and 908 about the hinge connection 910, i.e., about the X axis 917.

The display panels 904 and 906, in accordance with example implementations, are rectangular and accordingly, have portrait orientations and landscape orientations, depending on their spatial orientations. The "landscape orientation" for the display panel 904, 906 refers to the display panel 904, 906 being positioned such that the elongated dimension of the display panel 904, 906 is more horizontal than vertical (i.e., the local X axis 917 is more horizontal than vertical); and the "portrait orientation" for the display panel 904, 906 refers to the display panel 904, 906 being positioned such that the elongated dimension of the display panel 904, 906 is more vertical than horizontal (i.e., the local X axis 917 is more vertical than horizontal).

In accordance with example implementations, the user interface engine 120, based on data acquired by one or multiple sensors 950 (see FIG. 9) of the display panel 904, such as accelerometers, and one or multiple sensors 952 of the display panel 908, such as accelerometers, classifies the computer 900 as belonging to one of the nine display configurations 1040. Each display configuration 140, in turn, is associated with, or corresponds to, a device mode for the computer 900.

FIG. 10 depicts a clam shell display configuration 1040-1 that corresponds to a clam shell device mode for the computer 900. In accordance with example implementations, for the clam shell display configuration 1040-1, an opening angle Θ between the display panels 904 and 908 about the local X axis 917 is between 45 and 135 degrees (as an example), and the display panels 904 and 908 are in landscape orientations.

As also depicted in FIG. 10, the potential display configurations 1040 may include flat display configurations 1040-2 and 1040-3, in which the opening angle is between 135 and 225 degrees (as an example). In accordance with example implementations, the flat display configuration 1040-2 corresponds to a device mode in which the display panel 908 is closer to a user of the computer 900, whereas the flat display configuration 1040-3 corresponds to a device mode in which the display panel 904 is closer to the user. In accordance with example implementations, the user interface engine 120 may determine which display panel 904 or 908 is closer to the user based on an output of touch sensors of the computer 900, detected interaction of the user with a particular display panel (the use of a particular display panel as being used as a keyboard, for example), and so forth.

The computer 900 may be placed in a display configuration 1040-4 or 1040-5 in which the opening angle Θ may be between 225 to 315 degrees (as an example). The computer 900, when placed in the display configuration 1040-4, resembles a tent and corresponds to a tent device mode for the computer 900; and the computer 900, when placed in the other display configuration 140-5, resembles a stand (with the display panel 908 forming the base of the stand) and corresponds to a stand device mode for the computer 900. In accordance with example implementations, the user interface engine 120 may distinguish the tent display configuration 1040-4 from the stand display configuration 1040-5 by determining, for example, whether both display panels 904 and 908 are vertically inclined (for the tent display configuration 1040-4) or not (for the stand display configuration 1040-5).

The computer 900 may also be placed in a tablet display configuration, such as a user facing tablet display configuration 1040-6 (which corresponds to a user facing tablet device mode) or a world facing tablet display configuration 1040-7 (which corresponds to a world facing tablet device mode). In the tablet device display configuration 1040-6 or 1040-7, the computer 900 is fully or near fully opened, with the opening angle Θ being between 315 to 360 degrees (as an example). Moreover, one of the display panels 904 and 908 faces the user, with the other display panel facing away from the user. More specifically, the user interface engine 120 may identify the user facing tablet display configuration 1040-6 by detecting that the display 915 faces the user (through display panel position data, user detected interaction with the display panel 904, and so forth). The user interface engine 120 may identify the world facing tablet display configuration 1040-7 by detecting that the display 911 faces the user.

The potential display configurations 1040 may also include book display configurations 1040-8 and 1040-9 in which the opening angle Θ is 45 to 180 degrees (as an example), and the displays panels 904 and 908 are in portrait orientations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   detecting a finger pattern associated with a physical interaction of a user with a touch screen of an electronic device, wherein the detecting is based on sensing a physical contact with the touch screen or sensing an object hovering over the touch screen;
   acquiring sensory input associated with the user other than a characteristic of the physical interaction of the user with the touch screen;
   determining whether the physical interaction is associated with an intent to use the touch screen for a key-based input entry based on the sensory input, wherein determining whether the physical interaction is associated with the intent to use the touch screen for the key-based input entry comprises processing the sensory input to:
      identify the user and determine whether the user is authenticated based on the identification of the user, and
      determine whether a position and an orientation of the electronic device is consistent with the user interacting with the touch screen;
   determining, in the finger pattern, how many fingers are interacting with the touch screen that displays an image;
   selecting, based on determining how many fingers are physically interacting with the touch screen, a virtual key-based user interface from a plurality of different types of virtual key-based user interfaces, wherein the different types of virtual key-based user interfaces correspond to different quantities of fingers physically interacting with the touch screen; and
   displaying the selected virtual key-based user interface in the touch screen.

2. The method of claim 1, wherein the different types of virtual key-based user interfaces comprise a virtual keyboard having keys for alphanumeric characters, and a virtual numeric keypad, and wherein the selecting comprises:
   selecting the virtual keyboard responsive to a first quantity of fingers physically interacting with the touch screen, and
   selecting the virtual numeric keypad responsive to a different second quantity of fingers physically interacting with the touch screen.

3. The method of claim 1, wherein:
   acquiring the sensory input comprises acquiring biometric information, and
   processing the sensory input comprises processing the biometric information to identify the user.

4. The method of claim 1, wherein:
   acquiring the sensory input comprises acquiring image data representing an image of the user, and
   processing the sensory input comprises performing facial recognition based on the image data to identify the user.

5. The method of claim 1, wherein:
   acquiring the sensory input comprises wireless communicating with a wearable device, and
   processing the sensory input comprises determining whether an authenticated user is associated with the wearable device.

6. The method of claim 1, further comprising:
   selecting a characteristic of the selected virtual key-based user interface based on the identification of the user.

7. The method of claim 6, further comprising acquiring sensory input associated with another user and controlling another user interface for the electronic device based on the sensory input associated with the another user.

8. An article comprising a non-transitory computer readable storage medium comprising instructions that, when executed by a computer, cause the computer to:
   detect a finger pattern associated with a physical interaction of a user with a touch screen of the computer, wherein the detecting is based on sensing a physical contact with the touch screen or sensing an object hovering over the touch screen;
   acquire sensory input associated with the user, the sensory input different from the physical interaction;
   determine, based on the sensory input, whether the physical interaction is associated with an intent to use the touch screen for a key-based input entry, wherein determining whether the physical interaction is associated with the intent to use the touch screen for the key-based input entry comprises processing the sensory input to:
      identify the user and determine whether the user is authenticated based on the identification of the user, and
      determine whether a position and an orientation of the computer is consistent with the user interacting with the touch screen;
   determine, in the finger pattern, how many fingers are interacting with the touch screen that displays an image;
   selecting, based on determining how many fingers are physically interacting with the touch screen, a virtual key-based user interface from a plurality of different types of virtual key-based user interfaces, wherein the different types of virtual key-based user interfaces correspond to different quantities of fingers physically interacting with the touch screen; and
   cause display of the selected virtual key-based user interface in the touch screen.

9. The article of claim 8, wherein the instructions when executed by the computer cause the computer to:
   detect, in the finger pattern, an area of the touch screen associated with a finger physically interacting with the touch screen; and
   regulate a size of the selected virtual key-based user interface displayed on the touch screen based on the detected area.

10. The article of claim 9, wherein the instructions when executed by the computer cause the computer to regulate the size of the selected virtual key-based user interface by regulating a size of a data entry key in the selected virtual key-based user interface.

11. An apparatus comprising:
a display device;
a first sensor to detect a physical interaction between a user and a touch screen of the display device, wherein the first sensor is part of the touch screen, and detecting the physical interaction comprises detecting a physical contact with the touch screen or detecting an object hovering over the touch screen;
a second sensor to provide a sensory input;
a processor to:
detect, based on an output of the first sensor, a finger pattern associated with the physical interaction;
based on the sensory input, determine whether the physical interaction is associated with an intent to invoke a virtual key-based user interface, wherein determining whether the physical interaction is associated with the intent comprises processing the sensory input to:
identify a user and determine whether the user is authenticated based on the identification of the user, and
determine whether a position and an orientation of the display device is consistent with the user interacting with the touch screen;
determine, in the finger pattern, how many fingers are interacting with the touch screen that displays an image;
select, based on determining how many fingers are physically interacting with the touch screen, a virtual key-based user interface from a plurality of different types of virtual key-based user interfaces, wherein the different types of virtual key-based user interfaces correspond to different quantities of fingers physically interacting with the touch screen; and
cause display of the selected virtual key-based user interface in the touch screen.

12. The apparatus of claim 11, further comprising:
a third sensor to indicate the orientation of the display device,
wherein the processor is to:
determine a device mode based on the orientation, and
select the virtual key-based user interface from the plurality of different types of virtual key-based user interfaces further based on the device mode.

13. The apparatus of claim 11, wherein the processor is to select the virtual key-based user interface based on a time duration over which the finger pattern is detected.

14. The method of claim 2, wherein the second quantity is less than the first quantity.

15. The method of claim 1, wherein the different types of virtual key-based user interfaces comprise a first virtual key-based user interface comprising a first quantity of keys, and a second virtual key-based user interface comprising a second quantity of keys, the second quantity of keys being different from the first quantity of keys.

16. The method of claim 1, further comprising:
determining a device mode of a plurality of different device modes in which the electronic device is operational,
wherein determining whether the physical interaction is associated with the intent to use the touch screen for the key-based input entry is further based on the determined device mode.

17. The article of claim 8, wherein the different types of virtual key-based user interfaces comprise a virtual keyboard having alphanumeric keys, and a virtual numeric keypad, and wherein the instructions when executed by the computer cause the computer to select the virtual key-based user interface by:
selecting the virtual keyboard responsive to a first quantity of fingers physically interacting with the touch screen, and
selecting the virtual numeric keypad responsive to a different second quantity of fingers physically interacting with the touch screen.

18. The article of claim 17, wherein the second quantity is less than the first quantity.

19. The article of claim 8, wherein the different types of virtual key-based user interfaces comprise a first virtual key-based user interface comprising a first quantity of keys, and a second virtual key-based user interface comprising a second quantity of keys, the second quantity of keys being different from the first quantity of keys.

20. The apparatus of claim 11, wherein the different types of virtual key-based user interfaces comprise a virtual keyboard having alphanumeric keys, and a virtual numeric keypad, and wherein the processor is to select the virtual key-based user interface by:
selecting the virtual keyboard responsive to a first quantity of fingers physically interacting with the touch screen, and
selecting the virtual numeric keypad responsive to a different second quantity of fingers physically interacting with the touch screen.

* * * * *